(12) United States Patent
Boria

(10) Patent No.: US 9,719,800 B2
(45) Date of Patent: Aug. 1, 2017

(54) SCREEN SYMBOLOGY

(71) Applicant: Sikorsky Aircraft Corporation, Stratford, CT (US)

(72) Inventor: Greg Boria, Woodbury, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 353 days.

(21) Appl. No.: 14/251,872

(22) Filed: Apr. 14, 2014

(65) Prior Publication Data
US 2015/0292901 A1    Oct. 15, 2015

(51) Int. Cl.
| | |
|---|---|
| *G01C 21/00* | (2006.01) |
| *G01C 23/00* | (2006.01) |
| G01C 21/30 | (2006.01) |
| G01C 21/36 | (2006.01) |
| G01C 21/16 | (2006.01) |
| G01C 21/20 | (2006.01) |

(52) U.S. Cl.
CPC .............. *G01C 23/00* (2013.01); *G01C 21/00* (2013.01); *G01C 21/16* (2013.01); *G01C 21/20* (2013.01); *G01C 21/30* (2013.01); *G01C 21/367* (2013.01)

(58) Field of Classification Search
CPC ........ G01C 23/00; G01C 21/00; G01C 21/20; G01C 21/16; G01C 21/30; G01C 21/367
See application file for complete search history.

(56) References Cited

U.S. PATENT DOCUMENTS

| | | | | |
|---|---|---|---|---|
| 3,521,227 A | * | 7/1970 | Izumi ...................... | G01S 1/02 340/973 |
| 3,754,440 A | * | 8/1973 | Edgerton ............... | G01C 23/00 701/14 |
| 4,044,709 A | * | 8/1977 | Green .................... | B64D 43/00 116/280 |
| 4,096,633 A | * | 6/1978 | Nolan ...................... | G01S 1/02 116/318 |
| D394,251 S | | 5/1998 | Arnone | |
| 5,952,570 A | * | 9/1999 | Berlioz .................. | B64D 43/02 116/37 |
| 6,028,536 A | * | 2/2000 | Voulgaris ............. | G01C 23/005 340/973 |
| 6,167,627 B1 | * | 1/2001 | Wilder ................... | G01C 21/20 235/61 NV |

(Continued)

FOREIGN PATENT DOCUMENTS

GB                854904 A    * 11/1960 ............. G05D 1/102

OTHER PUBLICATIONS

Adrian Frutiger, 1997, Watson-Gupttill Publications, Signs and Symbols: Their Design and Meaning, p. 24.

(Continued)

*Primary Examiner* — Joseph Feild
*Assistant Examiner* — Rufus Point
(74) *Attorney, Agent, or Firm* — Cantor Colburn LLP

(57) ABSTRACT

A method and system for enhancing situational awareness in a rotary wing aircraft, includes receiving signals indicative of environmental information for the aircraft during a hover; determining signals indicative of a heading, course, and speed for the aircraft in response to the receiving of the environmental information; and displaying a composite symbology for heading, course, and speed on tactical display.

17 Claims, 4 Drawing Sheets

(56) References Cited

U.S. PATENT DOCUMENTS

| | | | | |
|---|---|---|---|---|
| 7,091,881 | B2* | 8/2006 | Judge | G01C 23/00 340/946 |
| D581,941 | S | 12/2008 | Melander et al. | |
| 7,928,862 | B1* | 4/2011 | Matthews | G01C 23/00 244/17.11 |
| D650,793 | S | 12/2011 | Impas et al. | |
| D651,613 | S | 1/2012 | Ouihet | |
| D652,053 | S | 1/2012 | Impas et al. | |
| 8,155,806 | B2 | 4/2012 | Suddreth et al. | |
| 8,354,943 | B2 | 1/2013 | Bacabara et al. | |
| D687,062 | S | 7/2013 | Gardner et al. | |
| 8,604,942 | B2* | 12/2013 | Whitlow | G01C 23/00 340/961 |
| 8,641,526 | B1* | 2/2014 | Sitnikov | A63F 13/803 463/37 |
| D701,517 | S | 3/2014 | Thornton et al. | |
| D711,910 | S | 8/2014 | Inose et al. | |
| D714,810 | S | 10/2014 | Lee et al. | |
| D719,578 | S | 12/2014 | Inose et al. | |
| D725,144 | S | 3/2015 | Johnson | |
| D726,196 | S | 4/2015 | Van Os | |
| D730,364 | S | 5/2015 | Inose et al. | |
| 9,091,545 | B2* | 7/2015 | Still | G01C 23/00 |
| D743,438 | S | 11/2015 | Inose et al. | |
| 2003/0222887 | A1* | 12/2003 | Wilkins, Jr. | G01C 23/005 345/618 |
| 2005/0237226 | A1* | 10/2005 | Judge | G01C 23/00 340/946 |
| 2007/0120856 | A1 | 5/2007 | De Ruyter et al. | |
| 2009/0150073 | A1 | 6/2009 | Caraballo | |
| 2010/0131201 | A1 | 5/2010 | Bacabara et al. | |
| 2010/0134323 | A1* | 6/2010 | Bacabara | G01C 23/00 340/973 |
| 2011/0282759 | A1 | 11/2011 | Levin et al. | |
| 2012/0290977 | A1 | 11/2012 | Devecka | |
| 2013/0093612 | A1 | 4/2013 | Pschierer et al. | |
| 2013/0096819 | A1 | 4/2013 | Tarnok | |
| 2013/0226370 | A1* | 8/2013 | Muensterer | G01C 23/005 701/1 |
| 2014/0068430 | A1 | 3/2014 | Wu et al. | |
| 2014/0123072 | A1 | 5/2014 | Bhowmick et al. | |
| 2014/0181650 | A1 | 6/2014 | Polubinski | |
| 2014/0223481 | A1 | 8/2014 | Fundament | |
| 2014/0344716 | A1 | 11/2014 | Martin et al. | |
| 2015/0211883 | A1* | 7/2015 | He | G05D 1/0858 340/946 |

OTHER PUBLICATIONS

Stock Photography: Arrows Icons, Posted at Dreamstime,Com, Posting Date Not Given, Copyright 2000-2015 Maxborovkov|Dreamstime.Com, [Site Visited Oct. 14, 2015.] Available From Internet: www.Dreamstime.Com/Stock-Photography-Arrows-Icons-IMAGE12956162>.

Detailed Map of Spain with Bubble Icons, posted fotolia.com by Pomogayev, posting date not given,© 2016 Fotolia, [site visited Mar. 17, 2015]. Available from internet:<https://www.fotolia.com/id/91096308>.

Stock Vector Illustration: GPS Icon Set, posted shutterstock.com by blinkblink, posting date not given,© 2003-2016 Shutterstock, Inc., [site visited Mar. 17, 2015]. Available from internet: <http://www.shutterstock.com/pic-69602815/stock-vector-gps-iconset.html?src=qfgdNyBD3K8-h09DMW.

Henry Dreyfus, 1972, Van Nostrand Reinhold Company, Symbol Sourcebook, pp. 26-27; 172-173; 216-217.

iOS 6: Workarounds and how to deal with Apple Maps limitations, posted ismashphone.com by 8Bitjay, posted Sep. 21, 2012, © Smash Phone, [site visited Mar. 17, 2015]. Available from internet:<http://ismashphone.com/2012/09/ios-6-workarounds-and-how-to-deal-wi.

"Stock Vector Illustration: Set flat arrow icons and map pointers for web design, mobile apps and buttons", posted at shutterstock.com by John Rodygin, posting date not given, Copyright 2003-2015 Shutterstock, Inc., [site visited Oct. 14, 2015]. available from Internet: <http://www.shutterstock.com/pic-157930658/stock-vector-set-flat-arrow-icons-and-map-pointers-for-web-design-mobile-apps-and-buttons.htlm>.

Trimble GPS Hunt Pro, posted play.google.com, posting date not given,© 2016 Google, [site visited Mar. 17, 2015]. Available from internet:<https://play.google.com/store/apps/details?id=com.trimble.outdoors.cabelas.hunt>.

\* cited by examiner

SCREEN SYMBOLOGY

FIELD OF THE INVENTION

The subject matter disclosed herein relates generally to the field of instrumentation for an aircraft and, in particular, to an integrated tactical navigation plot that provides augmented symbology cueing to a pilot in a rotary-wing aircraft.

DESCRIPTION OF RELATED ART

Typically, tactical navigation displays or plots on rotary-wing aircraft such as multi-mission helicopters provide information on a North Upward display to detect and track subsurface or surface contacts at sea utilizing sonar technology, with north being upward or at the top of the navigation display. Dipping sonar fitted to a range of multi-mission helicopters allows the helicopter to protect shipping assets from submarines or surface threats. In an example, these aircraft can drop active and passive sonar devices (sonobuoys) to determine the location of hostile submarines. However, in a multi-mission helicopter, heading and course at slow speeds are independent and can differ significantly. Information presented in North Upward requires mental rotation to re-align the information to the observer's operating orientation, which is Head Up. This mental rotation is a skill refined in experienced navigators. In times of high workloads, this re-alignment may cause confusion, especially on southerly courses. A pilot, during a mission, has to determine the helicopter's heading and course, determine a course of a weapon deployed from the helicopter, and determine a heading of other ships in the vicinity through various instrumentations in the cockpit and mental calculations. A tactical plot that that provides a helicopter's heading and course in relation to other vehicles in the water and which is significantly lower in complexity would be well received in the art.

BRIEF SUMMARY

According to one aspect of the invention, a method for enhancing situational awareness in a rotary wing aircraft comprises receiving, with a processor, signals indicative of environmental information for the aircraft during a hover; determining, with the processor, signals indicative of a heading, course, and speed for the aircraft in response to the receiving of the environmental information; and displaying, with the processor, a composite symbology for heading, course, and speed on a tactical display.

According to another aspect of the invention, a system for enhancing situational awareness in a rotary wing aircraft includes one or more sensors configured to receive signals indicative of environmental information for the aircraft during a hover; a computer operably connected to the one or more sensors and configured to: receive signals indicative of environmental information for the aircraft during a hover; determine signals indicative of a heading, course, and speed for the aircraft in response to the receiving of the environmental information; and display a composite symbology for heading, course, and speed on a tactical display.

According to another aspect of the invention, a rotorcraft includes an airframe; a main rotor disposed at the airframe, the rotor including a plurality of rotor blades; and a tactical display system for displaying screen symbology for the helicopter including: one or more sensors configured to receive signals indicative of environmental information for the rotorcraft during a hover; a computer operably connected to the one or more sensors and configured to: receive signals indicative of environmental information for the aircraft during a hover; determine signals indicative of a heading, course, and speed for the aircraft in response to the receiving of the environmental information; and display a composite symbology for heading, course, and speed on a tactical display.

Technical effects of the invention relate to a tactical navigation display that significantly lowers complexity of displaying heading and course of a rotary wing aircraft in relation to neighboring surface or subsurface contacts.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1:
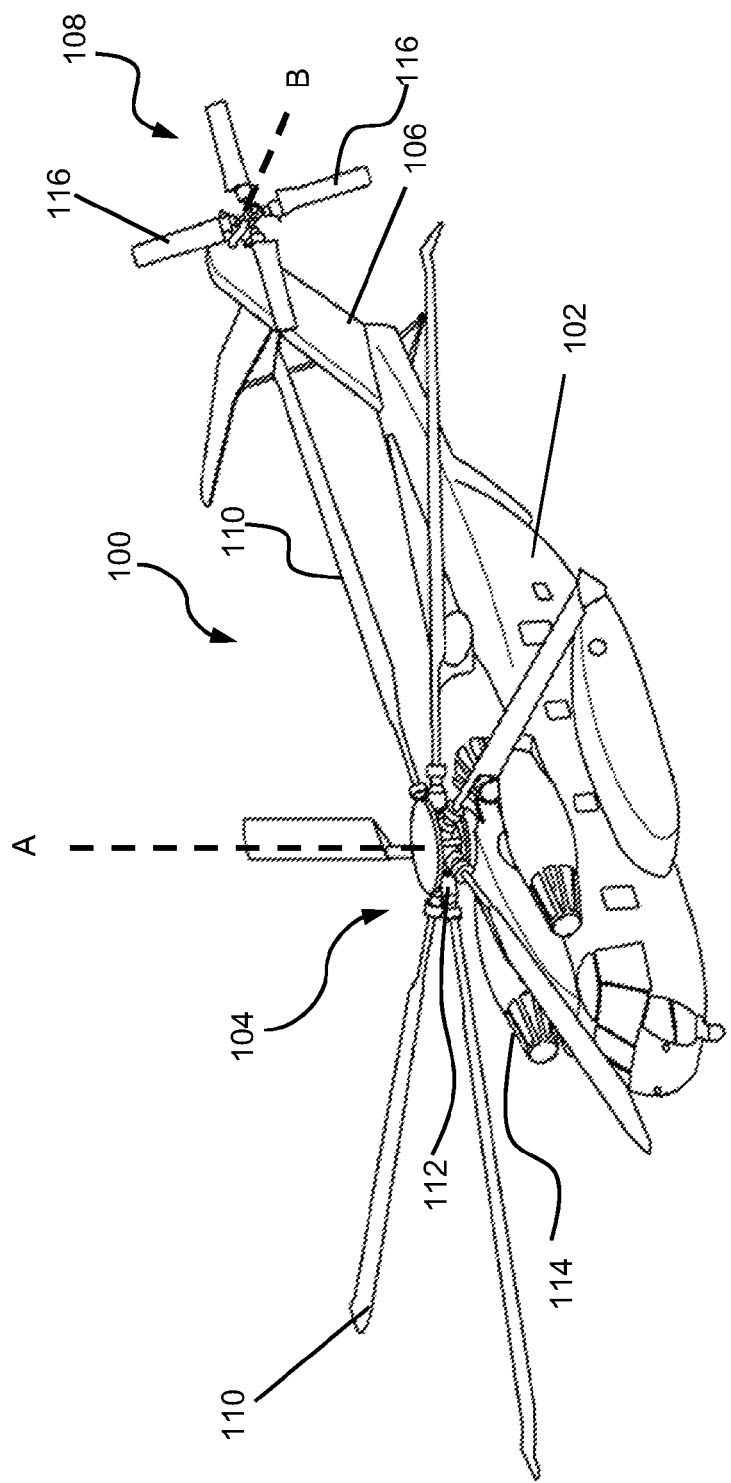
FIG. 1 is a perspective view of an exemplary aircraft for use with embodiments of the invention.

Referring now to the drawings, FIG. 1 illustrates a general perspective view of an exemplary vehicle in the form of a vertical takeoff and landing (VTOL) rotary-wing aircraft 100 for use with embodiments of the invention. In an embodiment, the aircraft 100 uses a tactical symbology algorithm 208 (FIG. 2) for displaying, in an example, aircraft 100 heading, course, and speed as well as target vehicles in a NORTH-UPWARD tactical display. As illustrated, rotary-wing aircraft 100 includes an airframe 102 having a main rotor assembly 104 and an extending tail 106 which mounts an anti-torque system, such as a tail rotor assembly 108. In embodiments, the anti-torque system may include a translational thrust system, a pusher propeller, a rotor propulsion system, or similar. The main rotor assembly 104 includes a plurality of rotor blades 110 mounted to a rotor hub 112 that rotates about axis A. Also, tail rotor assembly 108 includes a plurality of rotor blades 116 that rotates about axis B, which is orthogonal to the plane of rotation of blades 116. Main rotor assembly 104 and tail rotor assembly 108 are driven to rotate by one or more engines 114 through one or more gearboxes (not shown). Although a particular helicopter blade is illustrated and described in the disclosed embodiment, parts and spars in other configurations and/or machines, such as high speed compound rotary wing aircraft with supplemental translational thrust systems, dual contra-rotating, coaxial rotor system aircraft, tilt-rotors and tilt-wing aircraft, fixed wing aircraft, wind-turbines as well as composite primary structures designed to take fatigue cycling loads, regardless of dynamic, quasi static, or static loading will also benefit from embodiments of the invention.

Figure 2:
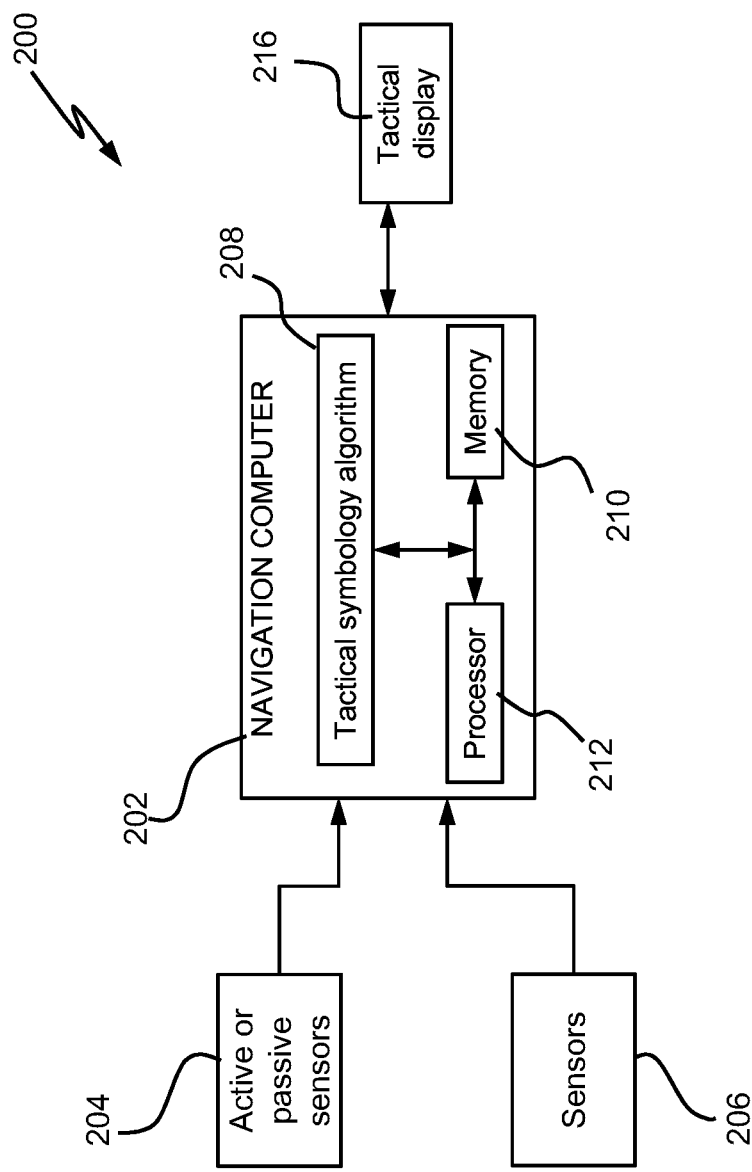
FIG. 2 is a system architecture block diagram according to an embodiment of the invention.

FIG. 2 illustrates a system 200 for an architecture that is used to implement the embodiments described herein. The system 200 uses a symbology algorithm 208 in order to display one or more symbologies for heading, course, and speed on a tactical display 216. In control system 200, sensor data from one or more sensors 206 that are located on helicopter 100 provide navigation computer 202 with information such as pitch and/or roll angular velocities, pitch and/or roll angular accelerations, vertical acceleration, airspeed, air density, or the like in order to provide state information for aircraft 100. In an example, sensors 206 provide environmental information on aircraft 100 during a hover to navigation computer 202. Also, active or passive sensors 204 such as, sonars or sonobuoys provide sonar information to detect and track subsurface or surface contacts for display on tactical display 216. In addition to the features described above, sensors 204 can include RADAR, Sonar, or the like to identify other information in the vicinity of aircraft 100. This information for other aircraft, ships, and submarines may be displayed on display 216. These may be displayed through sensor 204 detection or entered via manual entry or radio link for display on pilot display 216. Navigation computer 202 communicates with sensors 206, 204 to analyze the data with algorithm 208 and plot it in an efficient symbology format for pilot display 216. In an embodiment, navigation computer 202 includes a memory 210. Memory 210 stores symbology algorithm 208 as executable instructions that are executed by processor 212. The instructions may be stored or organized in any manner and at any level of abstraction, such as in connection with the execution of symbology algorithm 208. The algorithm 208, when executed by processor 212, enables navigation computer 202 to perform the features of the invention as discussed herein. Processor 212 may be any type of processor (CPU), including a general purpose processor, a digital signal processor, a microcontroller, an application specific integrated circuit, a field programmable gate array, or the like. Also, in embodiments, memory 210 may include random access memory (RAM), read only memory (ROM), or other electronic, optical, magnetic or any other computer readable medium onto which is stored the symbology algorithm 208 described below.

Figure 3:
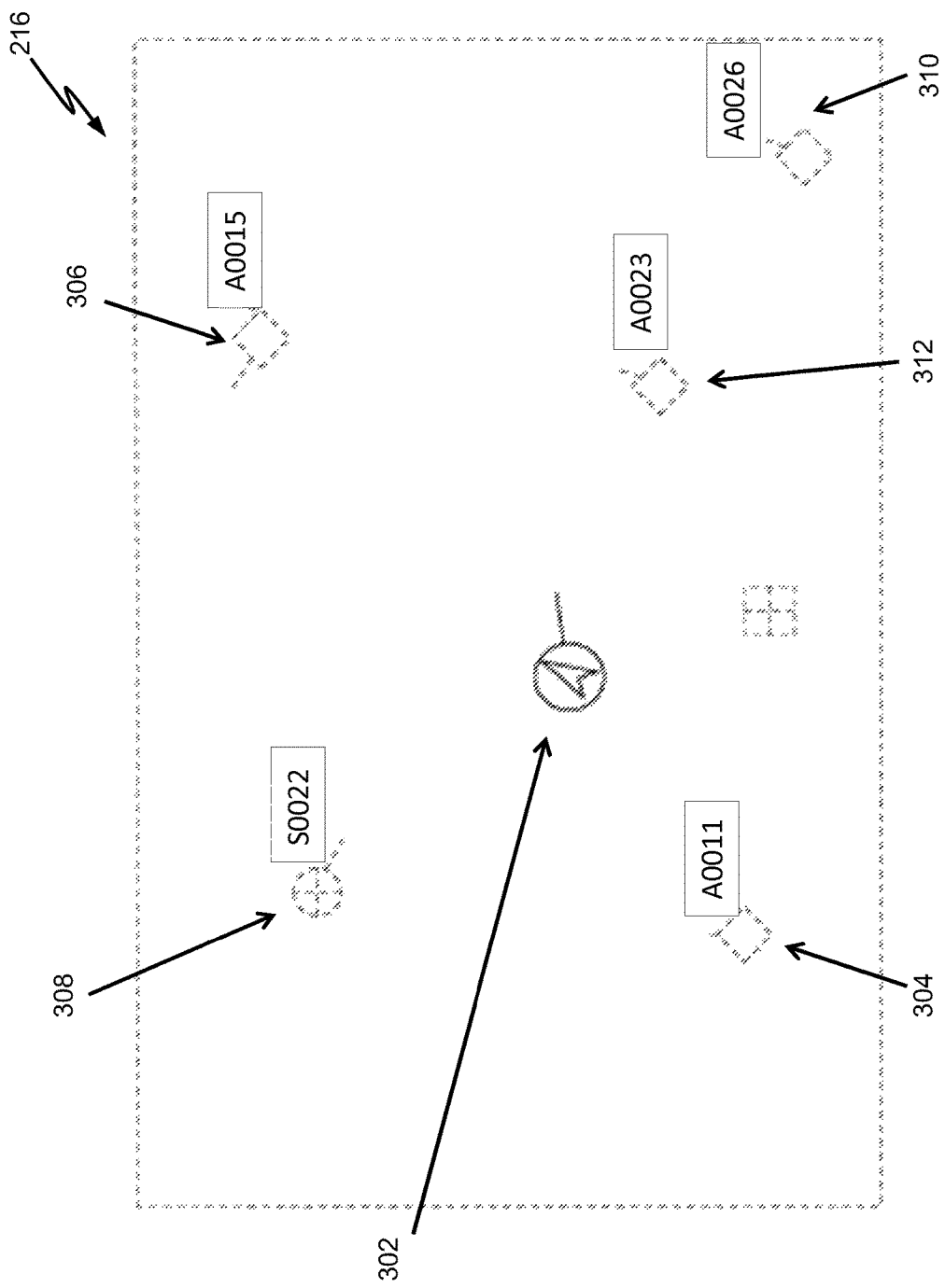
FIG. 3 is a tactical plot displaying symbology for an aircraft according to an embodiment of the invention.
Figure 4:
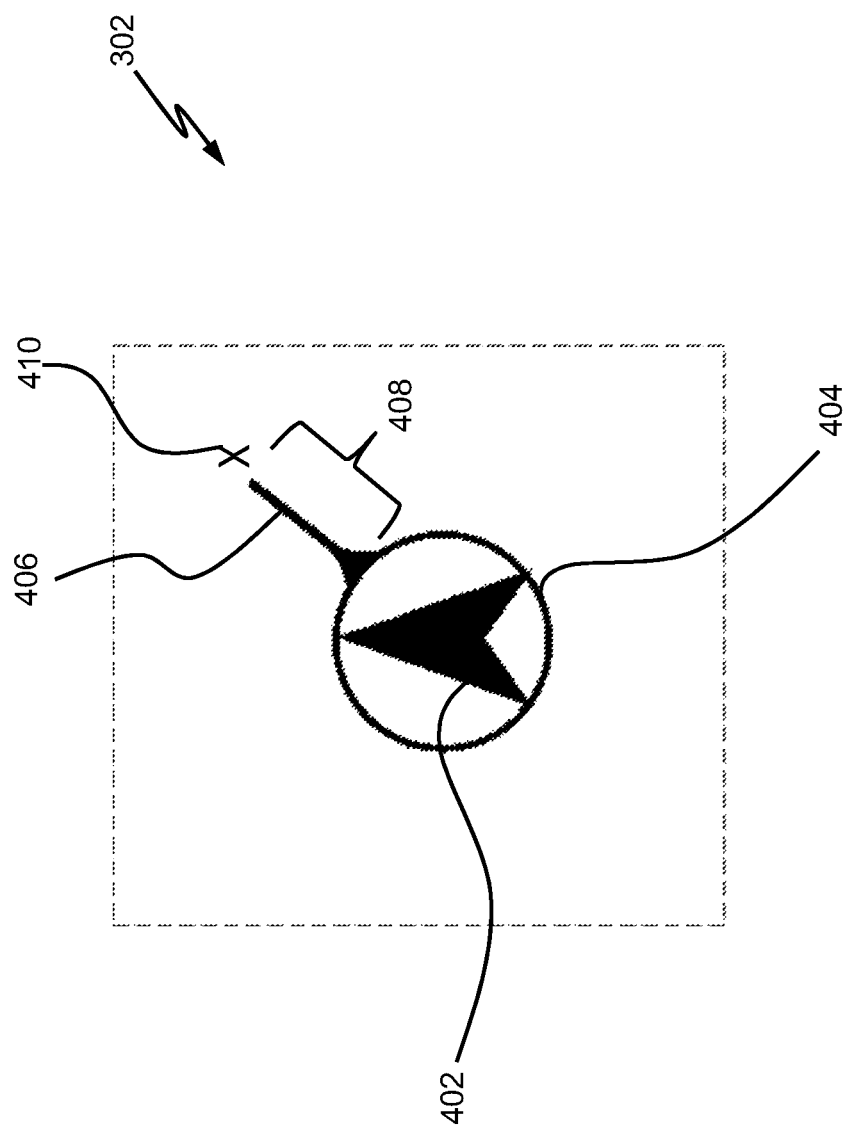
FIG. 4 is a detail of symbology of FIG. 3 according to an embodiment of the invention.

In an embodiment shown in FIG. 3, aircraft symbology 302 for aircraft 100 and other vehicle symbology 304-312 are depicted in a North-upward representation on a tactical plot 216. In another embodiment, a Heads-up or heads-down representation can also be presented in lieu of North-upward representation. Tactical plot 216 (FIG. 2) can depict symbology information for aircraft 100 and information on other remote surface or subsurface naval vessels that are acquired from one or more sensors 204 in relation to location of aircraft 100. In an example, aircraft 100 may acquire sensor information from other vehicles by hovering at a defined or predetermined location and lowering sensors 204 such as, for example, a sonar array tethered to aircraft 100 through a sonar cable. During the hover, the aircraft 100 monitors cable angle in case current in the water drags the sonar array through the water. The helicopter 100 will drift with the current in order to maintain a fixed cable with the sonar array. In an embodiment, heading and course of aircraft 100 can be different as the aircraft 100 drifts in the water. Aircraft symbology 302 is depicted on tactical plot 216 with heading, course, and speed. Other vehicle symbology 304-312 can include an elongated line associated with the respective symbology 304-312 to represent course of each naval vehicle associated with the other vehicle symbology 304-312. With reference to FIG. 4, aircraft symbology 302 is symbolized by a generally "arrow-head" shaped symbol 402 circumscribed by or inscribed in a circle 404 and an elongated line 406 that extends radially from the circle 404 having a length 408. In an embodiment, symbol 402 represents the same direction as aircraft heading, elongated line 406 indicates direction of motion or course of aircraft 100 in the direction of travel of aircraft 100, and the length of elongated line 406 indicates speed of aircraft 100 in the direction of travel. The speed of aircraft 100 can also be represented numerically as a number 410 at an end of elongated line 406, either in addition to or in lieu of the length of elongated line 406. As aircraft 100 drifts with the water, additional symbology for other vehicles identified in the water with sensors 204 (FIG. 2) may be depicted on tactical plot 216. In response to the symbology on tactical display 216, aircraft 100 may deploy armaments in the location of the other naval vehicles indicated by their relative location to aircraft 100 as depicted through other vehicle symbology 304-312.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangements not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for enhancing situational awareness in a rotary wing aircraft, comprising:
   receiving, with a processor, signals indicative of environmental information for the aircraft during a hover;
   determining, with the processor, signals indicative of a heading, course, and speed for the aircraft relative to a tactical plot in response to the receiving of the environmental information;
   displaying, with the processor, the tactical plot and a composite symbology for heading, course, and speed on tactical display on the tactical plot, wherein the composite symbology for course provides both a direction of travel relative to the heading of the rotary wing aircraft and the speed of the rotary wing aircraft in the direction of travel; and
   determining a course and location of other vehicles in relation to the aircraft.

2. The method of claim 1, further comprising depicting the heading symbology as an arrowhead symbol circumscribed in a circle.

3. The method of claim 1, further comprising depicting the course symbology as an elongated line symbol that extends radially from the circle.

4. The method of claim 1, further comprising depicting the speed symbology as a defined length of the elongated line.

5. The method of claim 3, further comprising depicting the speed symbology as a number with the elongated line symbol.

6. The method of claim 1, further comprising depicting symbology for the other vehicles on the tactical display in response to the determining the course and the location.

7. A system for enhancing situational awareness in a rotary wing aircraft, comprising:
    one or more sensors configured to receive signals indicative of environmental information for the rotorcraft during a hover; and
    a computer operably connected to the one or more sensors and configured to:
        receive signals indicative of environmental information for the aircraft during a hover;
        determine signals indicative of a heading, course, and speed for the aircraft relative to a tactical plot in response to the receiving of the environmental information;
        display the tactical plot and a composite symbology for heading, course, and speed on tactical display on the tactical plot, wherein the composite symbology for course provides both a direction of travel relative to the heading of the rotary wing aircraft and the speed of the rotary wing aircraft in the direction of travel and
        determine a course and location of other vehicles in relation to the aircraft.

8. The system of claim 7, wherein the heading symbology is depicted as an arrowhead symbol circumscribed in a circle.

9. The system of claim 7, wherein the course symbology is depicted as an elongated line symbol that extends radially from the circle.

10. The system of claim 7, wherein the speed symbology is depicted as a defined length of the elongated line.

11. The system of claim 9, wherein the speed symbology is depicted as a number with the elongated line symbol.

12. The system of claim 7, wherein the computer is configured to depict symbology for the other vehicles on the tactical display in response to the determining the course and the location.

13. A helicopter comprising:
    an airframe;
    a main rotor disposed at the airframe, the rotor including a plurality of rotor blades; and
    a tactical display system for displaying screen symbology for the helicopter including:
        one or more sensors configured to receive signals indicative of environmental information for the rotorcraft during a hover;
        a computer operably connected to the one or more sensors and configured to:
            receive signals indicative of environmental information for the aircraft during a hover;
            determine signals indicative of a heading, course, and speed for the aircraft relative to a tactical plot in response to the receiving of the environmental information;
            display the tactical plot and a composite symbology for heading, course, and speed on tactical display on the tactical plot, wherein the composite symbology for course provides both a direction of travel relative to the heading of the rotary wing aircraft and the speed of the rotary wing aircraft in the direction of travel; and
            determine a course and location of other vehicles in relation to the aircraft.

14. The helicopter of claim 13, wherein the heading symbology is depicted as an arrowhead symbol circumscribed in a circle.

15. The helicopter of claim 13, wherein the course symbology is depicted as an elongated line symbol that extends radially from the circle.

16. The helicopter of claim 13, wherein the speed symbology is depicted as a defined length of the elongated line.

17. The helicopter of claim 15, wherein the speed symbology is depicted as a number with the elongated line symbol.

\* \* \* \* \*